Aug. 11, 1959     J. A. LOCKHEED     2,898,836
BUILDING PRESSURIZATION SYSTEM
Filed Dec. 13, 1956
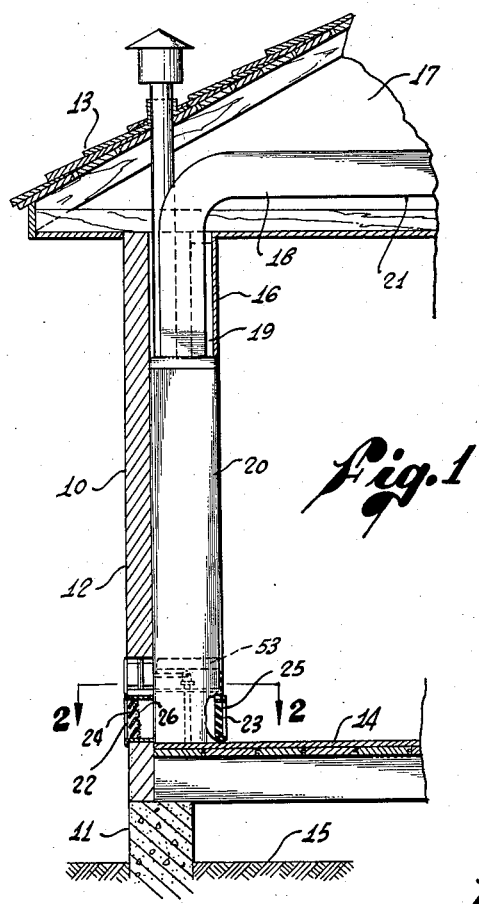
Fig. 1
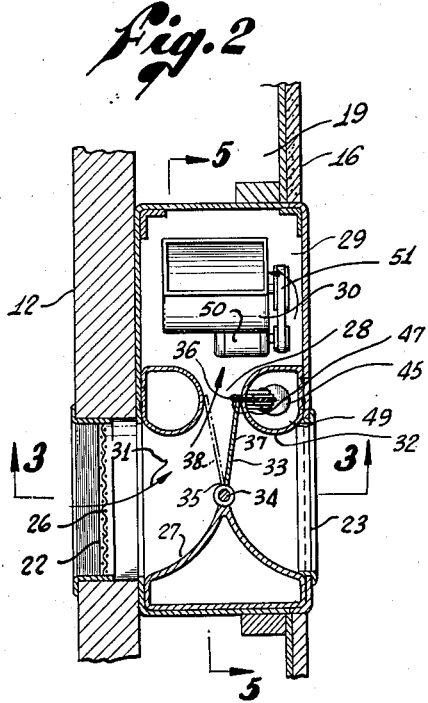
Fig. 2
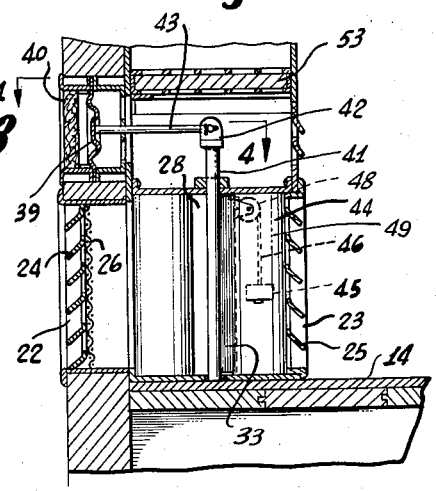
Fig. 3
Fig. 4
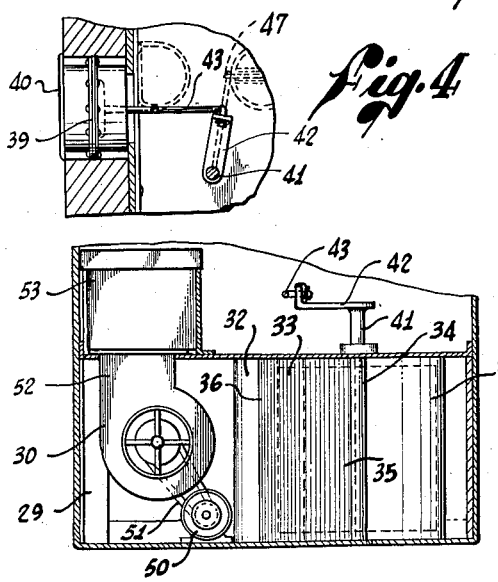
Fig. 5
INVENTOR.
JOHN A. LOCKHEED
Attorneys

2,898,836
BUILDING PRESSURIZATION SYSTEM

John A. Lockheed, Van Nuys, Calif.

Application December 13, 1956, Serial No. 628,196

6 Claims. (Cl. 98—1.5)

This invention relates generally to air conditioning systems for buildings, or for such enclosures as automobiles and house trailers, and more particularly to a system in which the air within the building is maintained at a pressure slightly higher than exterior air pressure by continuously circulating to the building interior a stream of air in which the proportions of new air and recirculation air are continuously and automatically determined by the difference between interior and exterior pressures. In its preferred form, the system employs a swinging panel proportioning valve, an intake chamber for receiving air from said valve, and a diaphragm sensing means for controlling said valve. A feature of one preferred form is a means for limiting the maximum pressure difference to avoid breaking the water seals used in the sewer outlet traps of the plumbing system of the building.

In the past, it has been attempted to reduce the amount of dirt particles and other undesirable impurities brought into a dwelling or the building by the ventilation air, by forcing the incoming air through filters of various types. However, the unwanted air contaminants generally have entered buildings in substantial amounts by way of open doors and windows. Modern air cooling and heating systems have made it possible to reduce the intake of new air, and therefore the intake of dirt and the like, by maintaining the building as an enclosed system and passing mostly recirculated air to the cooling or heating unit. It is clear, however, that the only effective way to eliminate dirt from the interior air of a building is to avoid the entrance of any air except by way of a filtered intake. This is best accomplished by maintaining the interior air under a pressure slightly in excess of exterior air pressure. The pressure difference need not be great; a pressure difference corresponding to a hydrostatic head of only a few inches or even of a fraction of an inch may be sufficient. If such a pressure is maintained inside of a building, there is always an outward flow of air at any opening. The only inflowing air is brought in by a pressure-maintaining blower through an intake system which includes suitable filters. If windows are adequately sealed, and door openings are provided with weatherstripping, standard blowers of reasonable size are capable of providing the slightly elevated interior pressure necessary to effectively exclude inflowing air most of the time.

In the past, pressurization of buildings has not been found practical and the use of pressurization to exclude dirt has not been widespread. Air has generally been brought in from the exterior for some reason entirely unrelated to pressurizing a building. Most air conditioning systems bring in exterior air or recirculate air inside the building at rates which are adjusted up or down to maintain a particular interior temperature. The outside air brought in is kept to as small an amount as possible in order to use a minimum of heating in the winter and a minimum of air cooling in the summer. Ordinarily, recirculation of the air inside the building has been entirely independent of the amount of air brought in from the outside. Even in cases in which some attempt was made to pressurize a volume of air in a confining housing, the rate at which new exterior air was brought into the housing was entirely independent of the rate at which interior air was recirculated.

In a building or automobile in which doors and windows are frequently opened, new air must be brought into the building at a very substantial rate whenever interior air is lost and interior pressure falls. The introduction of exterior air must be discontinued as soon as adequate interior pressure has been reestablished, however, for many reasons. In the first place, continued introduction of exterior air may result in a waste of heating or air cooling. In the second place, certain facilities commonly found in buildings may be adversely affected; for example, most buildings have plumbing fixtures of some kind, and the law usually requires that the waste outlet from each plumbing fixture be provided with a J-pipe trap and an external vent to the air. Such plumbing traps usually have only three inches of water standing in them, and excessive pressurization within the building would expel this water and break the seal between the interior of the house and the interior of the sewer pipe and its vent pipe. Some air conditioning systems of the past, both pressurized and non-pressurized, have attempted to meet the varying demands on the air circulating systems by means of an intermittently operating blower. Intermittent operation has been found to be hard on both blower and its driving motor, as well as having the disadvantage of excessive power consumption for each start-up. Other systems have used two separate circulation systems, one for introducing new air and one for recirculating air in the interior of the building.

In the pressurization of airplane cabins, the pressurization equipment is expensive and complex, and must be entirely dedicated to bringing in air at a relatively low rate but at a relatively large increase in pressure. Such systems are in use only while the plane is in flight at very high elevations, and are not for the purpose of maintaining a slight interior pressure increase for excluding the entrance of dirt through door and window openings in use. Moreover, the interior air is recirculated at rate which has nothing to do with the maintainence of the difference between interior and exterior pressures.

It is an object of the present invention to provide a low pressure building pressurization system in which the rate at which exterior air is brought in is independent of temperature either inside or outside, and instead, is varied to maintain an interior pressure which is very slightly elevated over exterior pressure.

It is another object of the present invention to provide a pressurized air conditioning system in which the desired variations and intake of new air may be accomplished without interrupting the operation of the blower.

It is still another object of the invention to provide a pressurized air conditioning system which tends to maintain a predetermined difference between interior and exterior pressure regardless of changes in exterior pressure.

Still another object of the invention is to accomplish both the introduction of exterior air as necessary, and recirculation of interior air by means of a single continuously operating blower.

Finally, it is an important object of the invention to provide a pressurized air conditioning system in which the proportions of interior and exterior air passing through the blower may be smoothly and continuously varied as required by the pressurization demands of the building.

The foregoing and other objects of the invention will be understood from the following description, taken in connection with the accompanying drawings in which:

Figure 1 is a vertical sectional view through a part of a small house taken at the location of a compartment housing the intake system and the heating or cooling means;

Figure 2 is a plan view of a horizontal section taken through the intake system and blower at the line and in the direction of the arrows indicated by the figures 2—2 in Figure 1;

Figure 3 is a fragmentary and enlarged part of a vertical sectional view of the intake system, taken along the line and in the direction of the arrows 3—3 in Figure 2;

Figure 4 is a fragmentary plan view of a horizontal section taken along the lines and in the direction of the arrows 4—4 in Figure 3; and Figure 5 is a vertical sectional view taken longitudinally of the intake and blower system illustrated in Figure 2, along the line and in the direction of the arrows 5—5 in Figure 2.

In Figure 1, a one-story dwelling house indicated by the numeral 10, having a concrete foundation 11, an exterior wall 12, a shingle roof 13, a floor 14 supported above the ground level 15, an interior wall 16, and an attic space 17, is seen to be provided with an air conditioning system indicated generally by the numeral 18 and having its principal working parts housed in a compartment 19 between the exterior wall 12 and the interior wall 16.

Most of the air conditioning system 18 is comprised of conventional and well known parts such as the heating and air cooling unit indicated generally by the numeral 20, and the duct work 21, seen in the attic 17, for conducting the conditioned air to various outlets throughout the building 10.

New air is taken in from the exterior through exterior inlet 22. Some interior air is recirculated to the air conditioning unit 20 by recirculation inlet 23. Preferably, the openings of the two inlets are shielded by exterior and interior louvers 24 and 25 respectively.

In the horizontal sectional view of Figure 2, it is seen that exterior air inlet 22 is provided with a filtering screen 26 back of the shielding baffles 24. New air passing into the air conditioning system 18 by way of exterior air inlet 22 passes through an exterior air intake conduit 27 and an opening 28 into an enclosed intake chamber 29 which houses a blower 30. The movement of the air along this path to the blower 30 is indicated by the arrows 31.

Recirculated air from the interior of the building 10 reaches blower 30 by way of a recirculation air conduit 32, opening 28, and intake chamber 29.

It will be seen that both exterior air and recirculated interior air pass into the intake chamber 29 through an opening 28. Thus, the air passing into the blower 30 is comprised partly of new exterior air brought in through exterior air conduit 31, and partly of recirculated air entering through recirculation conduit 32. The proportions of exterior and interior air passing into the intake chamber 29 through the common intake opening 28 are determined by means of the swinging panel 33, which is hinged about a vertical axis at 34 along its upstream edge 35 and is free to swing at its downstream edge 36 in the opening 28 between two extreme positions, one, as illustrated in full line, completely closing the recirculation conduit 32 and allowing the passage of 100% exterior air through opening 28 to intake chamber 29; and a second extreme position indicated by dashed lines 38, in which the panel 33 closes the exterior air intake conduit 31 and passes 100% recirculation air through opening 28 to the intake chamber 29.

In a more primitive form of the invention, the intake system could be arranged so that the opening 28 was in direct communication with the interior of blower 30, thus eliminating the intake chamber 29. However, the intake chamber 29 is a refinement which is preferably employed, because it produces a smoother and more continuous flow of air into the blower 30 than would be the case if the blower 30 directly experienced the momentary fluctuations in airflow which occur at opening 28 when the proportioning panel 33 suddenly changes position. In order for the intake chamber 29 to fulfill its function effectively, the intake chamber should have a volume at least as great and preferably substantially greater than the volume of air within the blower 30 itself. For all practical purposes, the entire air volume inside the blower 30 may be considered as air in motion through the blower, and if the volume of the intake chamber 29 is less than the blower volume, the blower itself must serve as the fluctuation absorbing chamber, and therefore has moments of inefficient operation and of reduced airflow. The arrangement of intake conduits 31 and 32, opening 28, swinging panel 33, and intake chamber 29 is a preferred means for producing a substantially uninterrupted and continuous flow of air at a substantially constant rate of cubic feet per minute through the blower 30 regardless of changes in the proportioning valve panel 33.

The manner in which the panel 33 is controlled between its two extreme positions 37 and 38 will best be understood from a description of Figures 3 and 4, taken in connection with Figure 2. Figure 3 shows the front elevation and Figure 4 a plan view of a mechanical linkage connecting the panel 33 to a pressure sensing diaphragm 39 mounted in an opening 40 in the exterior wall 12 of the building 10, so that its center moves inwardly or outwardly in response to decreases or increases in the difference between interior and exterior pressures respectively. The mechanical linkage between the panel 33 and the diaphragm 39 consists of a hinge bar 41, which rotates integrally with the panel 33, a lever 42, which swings in a horizontal plane about an axis in common with the hinge bar 41, to which it is permanently affixed, and a push rod 43 connected at one end to the center of the diaphragm 39 and at the other end to the swinging end of the lever 42.

The diaphragm 39 has a substantial degree of resilient springness tending to return it to a zero position, which may correspond to any desired position of panel 33 between its two extreme positions 37 and 38. However, it is preferable not to rely on the resilience of the diaphragm 39 for biasing the panel 33 to correspond to a desired actuating pressure. It is preferable to use some positive but adjustable biasing means such as a spring or a weight to yieldably urge the panel 33 to a desired position, usually position 37, so that the proportioning intake valve system tends to bring in a maximum of new exterior air until pressure within the building interior builds up to a point such that the biasing is overcome partly or completely. In the particular embodiment illustrated, the panel 33 is yieldably biased to position 37 by means of a biasing weight arrangement 44, comprised of a few selected biasing weights 45, a weight carrying cable 46 (attached at its upper end to the panel 33 at 47), and a pulley 48 mounted on the inside surface of a columnar structure 49 formed of the wall surface of the recirculation air duct 32. The degree of biasing may be adjusted by adding or removing some of the biasing weights 45. Usually, these weights will be very light since the pressures dealt within the system of this invention are very small, usually only a few inches of water column pressure.

Another view of the principal parts of the assembly is shown in Figure 5. The blower 30 is seen in the intake chamber 29, together with its driving motor 50 and driving belt connection 51. The discharge duct 52 of the blower 30 directs air upwardly through a filter system 53 and thence through the other air conditioning apparatus contained in the housing 20, for example, air heating or air cooling means, at the choice of the operator. In localities in which smog or other chemical contaminants of the air are a problem, the filter 53 may be comprised, at least in part, of activated charcoal or the like for removing such impurities. Such a filter is uniquely effective in an air conditioning system built according to the present invention, since substantially all the interior air is filtered air, whereas in previously known non-pressurized systems, substantial amounts of impure air inevitably leaked into the building through other openings than the intake to the air conditioning filter system.

While the foregoing description completely describes the mechanical structure of a preferred specific embodiment, it will be obvious that the stiffness of the diaphragm 39 and the amount of biasing weight 45 employed, are open to a wide range of choice. However, it is preferred that the biasing 45 be sufficiently weak so that the swinging panel 33 moves to the position 38 to exclude exterior air and produce 100% recirculation of interior air whenever the interior pressure of building 10 exceeds the exterior pressure by an amount corresponding to the pressure seal in the building's plumbing traps, which usually corresponds to a pressure head of 3 inches of water.

On the other hand, the stiffness of the diaphragm 39 and the amount of biasing weights 45 may be balanced so that the proportioning panel 33 is in constant adjusting movement between positions 37 and 38 except when the pressure elevation in the interior building 10 falls to some predetermined desired minimum, which may in many practical instances be zero pressure difference.

It is an important distinguishing feature of the building pressurization system illustrated in the specific embodiment that the flow rate of air produced by the continuous operation of the blower 30 is sufficiently great so that the air pressure at the intake throat 28 is slightly lower than either exterior or interior pressure and there is no tendency for the higher pressure interior air to be lost by undesired backflow around the swinging end of panel 33 and outwardly through the interior air intake 22. Such an arrangement would not be possible, of course, for the high pressurization systems used in airplane cabins and the like. However, since the object of the present air conditioning system is entirely different from that of airplane cabin pressurization, namely to produce a clean atmosphere rather than a relatively high atmospheric pressure within the building 10, a proportioning valve of the general construction shown may be safely used without the loss of the slightly pressurized interior air through the exterior air intake 22.

Although I have described a preferred embodiment of my invention, it is evident that modifications of design and construction will be apparent to those skilled in the art, and I do not wish to be limited to the details illustrated and described herein, except as defined in the appended claims.

I claim:

1. An air conditioning system for air in a confined housing, which includes: a continuously operating blower for introducing air in to said housing at a pressure slightly higher than exterior pressure and at a substantially constant rate; an intake chamber in open communication with the intake of said blower and having a volume large relative to the volume of air within said blower; an exterior intake conduit for supplying outside air to said intake chamber; an interior intake conduit for recirculating air from the interior of said housing to said intake chamber; a swinging panel hinged at its upstream edge between said conduits and swinging at its downstream edge in the common opening of said conduits into said intake chamber to control the proportion of recirculated air passing into said chamber; biasing means for urging said panel into a position closing said recirculating air conduit and passing only outside air whenever the difference between interior and exterior pressure falls below a predetermined minimum; a pressure sensing diaphragm for sensing the difference between interior and exterior pressure; and linkage means between said diaphragm and said swinging panel to move said panel away from full closure of said recirculating air conduit and permit recirculation of interior air by said blower whenever the difference between exterior and interior pressure exceeds said predetermined minimum.

2. A pressurized air conditioning system for air in a building having plumbing with a gas trap seal between interior and exterior air, which system includes: a blower for introducing air into said building; an intake system for said blower, said intake including an exterior intake passage for introducing air from the exterior of said building and an interior intake passage for recirculating air from the interior of said building; intake valve means for simultaneously reducing the cross section of one of said passages while increasing the cross section of the other; means for positioning said intake valve means for maximum recirculation of interior air at a pressure difference between interior and exterior below that at which said gas seal would be broken; and means for changing said valve to admit new exterior air through said blower in a proportion which increases as the difference between interior and exterior pressure decreases below the pressure difference corresponding to said maximum recirculation position.

3. A pressurized air conditioning system for air in a building with a gas trap seal having a seal-breaking pressure, which system includes: a continuously operating blower for introducing air into said building at a pressure less than said seal-breaking pressure; a proportioning intake valve for said blower, having an inlet for new exterior air and an inlet for recirculated interior air; means for yieldably urging said intake valve to a 100% new air position; diaphragm means for sensing the difference between interior and exterior pressure; and means responsive to said diaphragm for moving said intake valve to a position in which the proportion of recirculated air corresponds to the drop below seal-breaking pressure of said difference between interior and exterior pressure.

4. A pressurized air conditioning system for air in a building with a gas trap seal having a seal-breaking pressure, which system includes: a continuously operating blower for introducing air into said building; a new air conduit for supplying exterior air to the intake of said blower; a recirculation air conduit for supplying air from the interior of said building to the intake of said blower; a swinging panel hinged at its upstream edge between said conduits, and swinging at its downstream edge in the common intake opening from said conduits to said blower, to control the proportions of new air and recirculating air passing to said blower; biasing means for yieldably urging said panel toward a 100 percent new air position; a pressure sensing diaphragm for sensing the difference between interior and exterior pressures; and linkage means between said diaphragm and said swinging panel to increase the proportion of recirculated air as the difference between interior and exterior pressure increases, the balance between said diaphragm means and said biasing means being such that the said panel is moved to a position of 100 percent air recirculation at a pressure less than said seal-breaking pressure.

5. A pressurized air conditioning system for air in a building with a gas trap seal having a seal-breaking pressure between interior and exterior air pressure, which system includes: a continuously operating blower for introducing air into said building; an intake conduit system for said blower, said system being comprised of a new air intake conduit, a recirculation air intake conduit, and an intake throat into which both said new air conduits and recirculation air conduit discharge; a swinging panel hinged at its upstream edge between said new air and said recirculation air conduits, and swinging at its downstream edge in said throat, to control the proportion of new and recirculation air passing to said blower; adjustable means yieldably urging said swinging panel toward a 100 percent new air position; diaphragm means for sensing the difference between interior and exterior pressure; linkage means between said diaphragm means and said swinging panel to continuously vary the proportion of new air inversely to said pressure difference, up to a 100 percent recirculation position for said panel at a pressure of less than seal-breaking pressure within said building; and means downstream from siad throat for cleaning said air prior to its introduction into the interior of said building.

6. A pressurized air conditioning system for air in a building with a gas trap seal having a seal-breaking pressure between interior and exterior air presesure, which system includes: a continuously operating blower for introducing air into said building; an intake chamber in open communication with the intake of said blower and having a volume large relative to the volume of air within said blower; an intake conduit system for said blower, said system being comprised of a new air intake conduit, a recirculation air intake conduit, and an intake throat discharging into said intake chamber into which both said new air conduits and recirculation air conduit discharge; a swinging panel hinged at its upstream edge between said new air and said recirculation air conduits, and swinging at its downstream edge in said throat, to control the proportion of new and recirculation air passing to said blower; adjustable means yieldably urging said swinging panel to a 100 percent new air position; diaphragm means for sensing the difference between interior and exterior pressure; linkage means between said diaphragm means and said swinging panel to continuously vary the proportion of new air inversely to said pressure difference, up to a 100 percent recirculation position for said panel at a pressure of less than seal-breaking pressure within said building; and means downstream from said throat for cleaning said air prior to its introduction into the interior of said building.

References Cited in the file of this patent

UNITED STATES PATENTS

| | | |
|---|---|---|
| 2,284,161 | McElgin | May 26, 1942 |
| 2,491,461 | Wood | Dec. 13, 1949 |